US010315496B2

(12) United States Patent
Archer

(10) Patent No.: US 10,315,496 B2
(45) Date of Patent: Jun. 11, 2019

(54) SYSTEMS AND METHODS FOR SUN PROTECTION

(71) Applicant: GM GLOBAL TECHNOLOGY OPERATIONS LLC, Detroit, MI (US)

(72) Inventor: Alex M. Archer, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/675,258

(22) Filed: Aug. 11, 2017

(65) Prior Publication Data

US 2019/0047385 A1   Feb. 14, 2019

(51) Int. Cl.
| | | |
|---|---|---|
| *G08B 23/00* | (2006.01) | |
| *B60J 3/04* | (2006.01) | |
| *G02F 1/01* | (2006.01) | |
| *G02F 1/133* | (2006.01) | |
| *B60J 1/20* | (2006.01) | |
| *B60Q 1/00* | (2006.01) | |

(52) U.S. Cl.
CPC ........ *B60J 3/04* (2013.01); *G02F 1/01* (2013.01); *G02F 1/13318* (2013.01); *B60J 1/20* (2013.01); *B60Q 1/00* (2013.01)

(58) Field of Classification Search
CPC ....... B60J 3/04; B60J 1/20; G02F 1/01; G02F 1/13318; B60Q 1/00
USPC .......................................................... 340/500
See application file for complete search history.

(56) References Cited

U.S. PATENT DOCUMENTS

| | | | | |
|---|---|---|---|---|
| 5,707,128 | A * | 1/1998 | Dugdale | G09B 9/326 353/11 |
| 9,702,183 | B1 * | 7/2017 | Ochiai | E06B 9/24 |
| 2009/0168185 | A1 * | 7/2009 | Augustine | B60J 3/04 359/613 |
| 2010/0020170 | A1 * | 1/2010 | Higgins-Luthman | B60Q 1/1423 348/135 |
| 2010/0094501 | A1 * | 4/2010 | Kwok | G02B 27/01 701/36 |
| 2015/0210287 | A1 * | 7/2015 | Penilla | B60W 40/08 701/49 |
| 2015/0273989 | A1 * | 10/2015 | Momot | B60J 3/04 701/36 |
| 2016/0012760 | A1 * | 1/2016 | Tanaka | G09G 3/3648 345/101 |
| 2017/0359495 | A1 * | 12/2017 | Hawes | H04N 5/238 |
| 2018/0046058 | A1 * | 2/2018 | Kaphengst | B60J 1/00 |

* cited by examiner

*Primary Examiner* — Naomi J Small
(74) *Attorney, Agent, or Firm* — Lorenz & Kopf, LLP

(57) ABSTRACT

Systems and methods are provided for sun protection for an occupant of a vehicle having at least one window. The method includes receiving, by a processor, an input from a source that identifies a selected location for sun protection on the at least one window; determining, by the processor, a coordinate location on the at least one window associated with the selected location; and outputting, by the processor, one or more control signals to a first image output system of a first projector to output a first image onto the at least one window at the coordinate location to provide sun protection for the occupant.

13 Claims, 10 Drawing Sheets

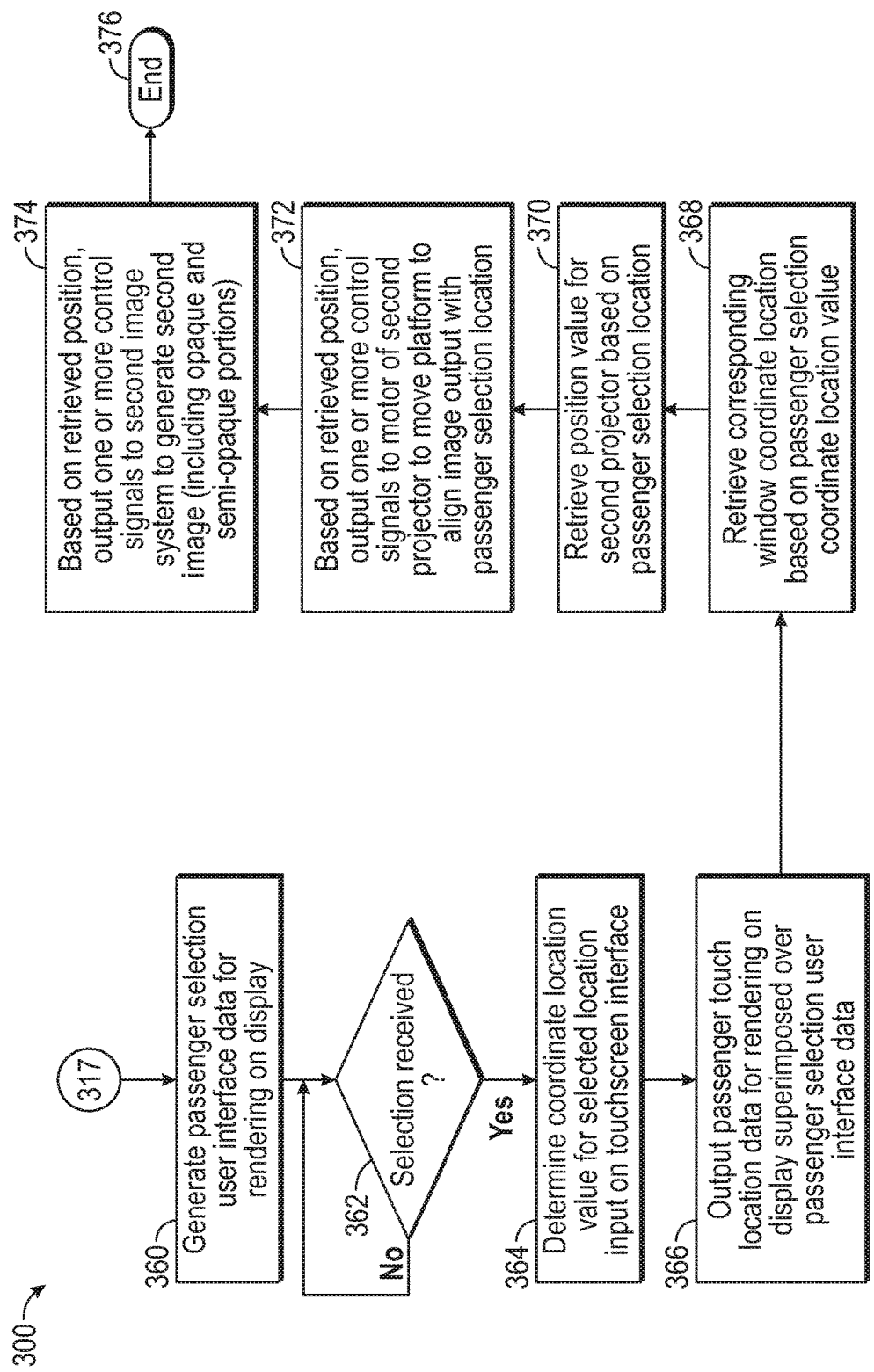

SYSTEMS AND METHODS FOR SUN PROTECTION

TECHNICAL FIELD

The present disclosure generally relates to vehicles, and more particularly relates to systems and methods for sun protection for an occupant of a vehicle.

BACKGROUND

Generally, certain vehicles, such as motor vehicles, are driven during daylight, sunrise and sunset conditions, in which the sun enters a cabin of the vehicle. In certain instances, a glare from the sun may hinder a driver and/or passenger's view out of one or more windows of the vehicle. Typically, the driver and/or passenger may position an overhead visor to obstruct a portion of the glare from the sun. Often times, however, the glare is located on the window in a location that is unreachable by the overhead visor. Moreover, the use of the overhead visor to obstruct the glare of the sun may reduce an occupant's view out of the window.

Accordingly, it is desirable to provide a sun protection system and method that enables a driver and/or passenger to obstruct the glare of the sun at any desired location on a window. It is also desirable to provide the system and method for sun protection such that the driver and/or passenger may obstruct the glare of the sun without requiring the use of an overhead visor. In addition, it is desirable to provide a sun protection system and method that enables a driver and/or passenger to obstruct the glare of the sun without reducing a visibility out of the window. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a method for sun protection for an occupant of a vehicle having at least one window. The method includes receiving, by a processor, an input from a source that identifies a selected location for sun protection on the at least one window; determining, by the processor, a coordinate location on the at least one window associated with the selected location; and outputting, by the processor, one or more control signals to a first image output system of a first projector to output a first image onto the at least one window at the coordinate location to provide sun protection for the occupant.

The receiving the input from the source that identifies the selected location further includes: receiving a request for sun protection from a source of input; generating, by the processor, selection user interface data for rendering on a display associated with the vehicle that includes a graphical representation of the at least one window; and receiving the input from a touchscreen interface associated with the display that identifies the selected location on the graphical representation of the at least one window. The determining, by the processor, the coordinate location on the at least one window associated with the selected location further includes: processing, by the processor, the received input from the touchscreen interface to determine a selected coordinate location value for the selected location; and retrieving, by the processor, a window coordinate location value from a table datastore based on the selected coordinate location value. The outputting, by the processor, the one or more control signals to the first image output system of the first projector to output the first image onto the at least one window at the coordinate location further includes: outputting, by the processor, one or more control signals to a first motor of the first projector to align the first image output system with the coordinate location on the at least one window. The method further includes: receiving, by the processor, an input from a source that identifies a second selected location for sun protection on the at least one window, the second selected location spaced apart from the selected location; determining, by the processor, a second coordinate location on the at least one window associated with the second selected location; outputting, by the processor, one or more control signals to a second motor of a second projector to align a second image output system of the second projector with the second coordinate location on the at least one window; and outputting, by the processor, one or more control signals to the second image output system to output a second image onto the at least one window to provide sun protection for the occupant. The first image includes a first opaque portion and a second semi-opaque portion at the coordinate location on the at least one window. The first opaque portion has a first diameter, which is different than a second diameter of the second semi-opaque portion. The method further includes: receiving, by the processor, an input from a source that identifies a third selected location for sun protection on the at least one window; and outputting, by the processor, one or more control signals to a third image output system of a third stationary projector to output a third image onto the at least one window to provide sun protection for the occupant.

In various embodiments, provided is a system for sun protection for an occupant of a vehicle having at least one window. The system includes a source of input that identifies a selected location for sun protection on the at least one window. The system includes a first projector having a first image output system that is configured to output a first image. The first image output system is movable relative to the vehicle by a first motor. The system includes a controller, having a processor, that is configured to: determine a coordinate location on the at least one window associated with the selected location; output one or more control signals to the first motor to align the first image output system with the coordinate location on the at least one window; and output one or more control signals to the first image output system to output the first image onto the at least one window to provide sun protection for the occupant.

The source of input that identifies the selected location is a touchscreen interface associated with a display of the vehicle, and the controller is configured to receive a request for sun protection from the source of input and to generate selection user interface data for rendering on the display associated with the vehicle that includes a graphical representation of the at least one window. The input from the touchscreen interface identifies the selected location on the graphical representation of the at least one window. The controller is configured to process the received input from the touchscreen interface to determine a selected coordinate location value for the selected location. The controller is configured to retrieve a window coordinate location value from a table datastore based on the selected coordinate location value to determine the coordinate location on the at least one window. The system further includes a source of input that identifies a second selected location for sun protection on the at least one window. The second selected location is spaced apart from the selected location. The system includes a second projector having a second image output system that is configured to output a second image. The second image output system is movable relative to the vehicle by a second motor. The controller is configured to: determine a second coordinate location on the at least one window associated with the second selected location; output one or more control signals to the second motor to align the second image output system with the second coordinate location on the at least one window; and output one or more control signals to the second image output system to output the second image onto the at least one window to provide sun protection for the occupant.

The first image includes a first opaque portion and a second semi-opaque portion at the coordinate location on the at least one window. The first opaque portion has a first diameter, which is different than a second diameter of the second semi-opaque portion. The system further includes: a source of input that identifies a third selected location for sun protection on the at least one window; and a third stationary projector having a third image output system that is configured to output a third image. The controller is configured to output one or more control signals to the third image output system to output the third image onto the at least one window to provide sun protection for the occupant.

In various embodiments, a vehicle having at least one window and a system for sun protection for an occupant is provided. The vehicle includes a touchscreen interface overlaid on a display associated with the vehicle that receives an input that identifies a selected location for sun protection on the at least one window. The vehicle includes a first projector having a first image output system that is configured to output a first image. The first image output system is movable relative to the vehicle by a first motor. The vehicle includes a second projector having a second image output system that is configured to output a second image. The second image output system is movable relative to the vehicle by a second motor. The vehicle includes a controller, having a processor, that is configured to: determine a coordinate location on the at least one window associated with the selected location; and at least one of output one or more control signals to the first motor to align the first image output system with the coordinate location on the at least one window and output one or more control signals to the first image output system to output the first image onto the at least one window to provide sun protection for the occupant, and output one or more control signals to the second motor to align the second projector with the coordinate location on the at least one window and output one or more control signals to the second image output system to output the second image onto the at least one window to provide sun protection for the occupant.

The first image includes a first opaque portion and a second semi-opaque portion at the coordinate location on the at least one window. The first opaque portion has a first diameter, which is different than a second diameter of the second semi-opaque portion. The controller is configured to generate selection user interface data for rendering on the display associated with the vehicle that includes a graphical representation of the at least one window and the input from the touchscreen interface identifies the selected location on the graphical representation of the at least one window.

DESCRIPTION OF THE DRAWINGS

The exemplary embodiments will hereinafter be described in conjunction with the following drawing figures, wherein like numerals denote like elements, and wherein:

FIG. 7 is a continuation of the flowchart of FIG. 5, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the vehicle systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
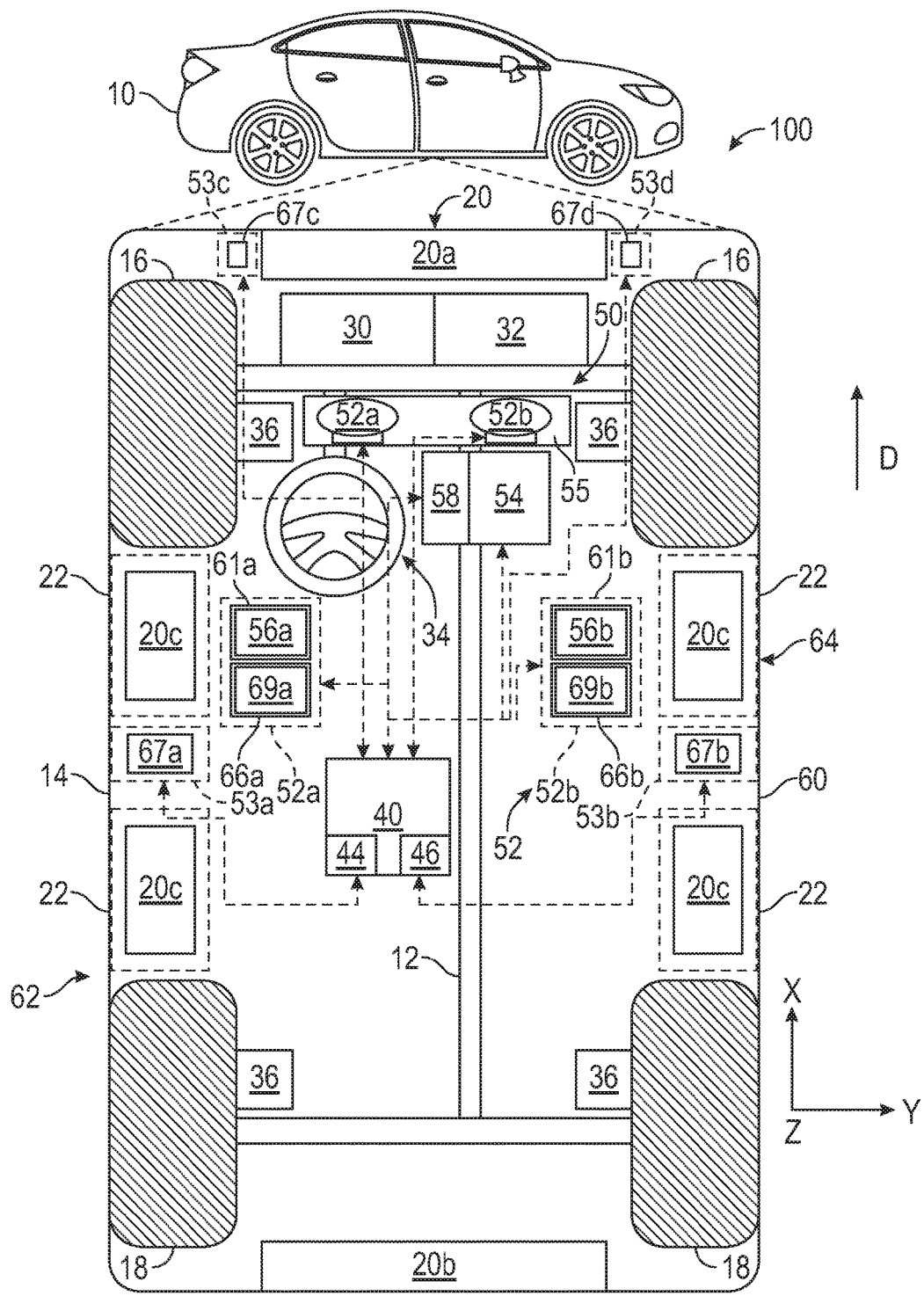
FIG. 1 is a functional block diagram illustrating a vehicle having a sun protection system, in accordance with various embodiments.

With reference to FIG. 1, a sun protection system shown generally at 100 is associated with a vehicle 10 in accordance with various embodiments. In general, the sun protection system 100 includes a human-machine interface 50, one or more movable projectors 52 and one or more stationary projectors 53. The sun protection system 100 provides sun protection to an occupant of the vehicle 10, such as a driver or passenger. Stated another way, the sun protection system 100 obstructs a glare of the sun on one or more windows 20 of the vehicle 10 without requiring the use of an overhead visor, as will be discussed further herein. By obstructing the glare of the sun, the driver and/or passenger is able to more easily see out of the respective window 20 of the vehicle 10. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 10 generally includes a chassis 12, a body 14, front wheels 16, and rear wheels 18. In certain embodiments, the vehicle 10 may be an autonomous vehicle that is capable of sensing its environment and navigating with little or no user input. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the vehicle 10 includes the one or more windows 20. Each of the windows 20 is coupled to a portion of body 14 to admit light and enable the occupants of the vehicle 10, such as the driver and/or passengers, to view an environment surrounding the vehicle 10. Thus, as used herein, a "window" may comprise a transparent surface associated with the vehicle 10 that enables an occupant to view an environment surrounding the vehicle 10. In this example, the windows 20 include at least a windshield 20a, a rearview window 20b and one or more side windows 20c. The windshield 20a may be coupled to the body 14 to be orientated forward of the rearview window 20b in a forward driving direction D of the vehicle 10. The side windows 20c may be coupled to one or more doors 22, which are pivotably mounted on the body 14. It should be noted that the vehicle 10 including the windshield 20a, rearview window 20b and the one or more side windows 20c is merely exemplary, as the vehicle 10 may have any number and configuration of windows, including, but not limited to, other side mounted windows (i.e. side windows not coupled to doors), roof mounted windows, etc., which may be employed with the sun protection system 100. The vehicle 10 is depicted in the illustrated embodiment as a passenger car, but it should be appreciated that any other vehicle including trucks, sport utility vehicles (SUVs), recreational vehicles (RVs), marine vessels, aircraft, etc., can also be used.

As shown, the vehicle 10 generally includes a propulsion system 30, a transmission system 32, a steering system 34, a brake system 36, a controller 40, the human-machine interface 50, the one or more movable projectors 52 and the one or more stationary projectors 53. The propulsion system 30 may, in various embodiments, include an internal combustion engine, an electric machine such as a traction motor, and/or a fuel cell propulsion system. The transmission system 32 is configured to transmit power from the propulsion system 30 to the wheels 16-18 according to selectable speed ratios. According to various embodiments, the transmission system 32 may include a step-ratio automatic transmission, a continuously-variable transmission, or other appropriate transmission. The brake system 36 is configured to provide braking torque to the wheels 16-18 and/or the transmission system 32. The brake system 36 may, in various embodiments, include friction brakes, brake by wire, a regenerative braking system such as an electric machine, and/or other appropriate braking systems. The steering system 34 influences the course of travel by the vehicle 10, for example by adjusting a position of the wheels 16-18. While depicted as including a steering wheel for illustrative purposes, in some embodiments contemplated within the scope of the present disclosure, the steering system 34 may not include a steering wheel.

The controller 40 includes at least one processor 44 and a computer readable storage device or media 46. The processor 44 can be any custom made or commercially available processor, a central processing unit (CPU), a graphics processing unit (GPU), an auxiliary processor among several processors associated with the controller 40, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 40 in controlling components associated with the sun protection system 100.

The instructions may include one or more separate programs, each of which comprises an ordered listing of executable instructions for implementing logical functions. The instructions, when executed by the processor 44, receive and process input signals, perform logic, calculations, methods and/or algorithms for controlling the components of the sun protection system 100 of the vehicle 10, and generate control signals to components of the sun protection system 100 to obstruct the glare of the sun in one or more of the windows 20 based on the logic, calculations, methods, and/or algorithms. Although only one controller 40 is shown in FIG. 1, embodiments of the vehicle 10 can include any number of controllers 40 that communicate over any suitable communication medium or a combination of communication mediums and that cooperate to process the sensor signals, perform logic, calculations, methods, and/or algorithms, and generate control signals to control features of the vehicle 10.

In various embodiments, one or more instructions of the controller 40 are associated with the sun protection system 100 and, when executed by the processor 44, the instructions receive and process signals from the human-machine interface 50 to determine various conditions associated with the operation of the vehicle 10. For example, as will be discussed herein, the instructions of the controller 40, when executed by the processor 44, determine whether an input is received for sun protection and generate driver or passenger selection user interface data for rendering on a display 54 associated with the human-machine interface 50. In various embodiments, the instructions of the controller 40, when executed by the processor 44, determine whether a selection was received for sun protection, and determine a coordinate location value for the selected position. In various embodiments, the instructions of the controller 40, when executed by the processor 44, determine a corresponding window location based on the coordinate location value. In various embodiments, the instructions of the controller 40, when executed by the processor 44, determine a position to move one of the movable projectors 52 associated with the sun protection system 100 and generate one or more control signals to one or more motors 56 associated with the respective one or more movable projectors 52 to move the respective movable projector 52 such that an image output by the movable projector 52 is substantially aligned with the selected window location. The instructions of the controller 40, when executed by the processor 44, also generate one or more control signals to the respective movable projector 52 to generate the image output, which obstructs the glare of the sun at the window location.

In various embodiments, the instructions of the controller 40, when executed by the processor 44, determine whether a selection to output one or more images to define a visor was requested. In various embodiments, the instructions of the controller 40, when executed by the processor 44, generate one or more control signals to the respective stationary projectors 53 to generate the image output, which defines the visor to obstruct the glare of the sun at along a portion of the selected window.

The human-machine interface 50 is in communication with the controller 40 via a suitable communication medium, such as a bus. The human-machine interface 50 may be configured in a variety of ways. In some embodiments, the human-machine interface 50 may include various switches or levers, one or more buttons, a touchscreen interface 58 that may be overlaid on the display 54, a keyboard, an audible device, a microphone associated with a speech recognition system, or various other human-machine interface devices. In one example, the touchscreen interface 58 may receive input, such as a request for sun protection and a selection for sun protection. The touchscreen interface 58 may include, but is not limited to, a resistive touchscreen panel, a capacitive touchscreen panel, a projected capacitance touchscreen panel, a surface capacitive touchscreen panel, a surface acoustic wave touchscreen panel, etc. Generally, upon the receipt of the touch or input from the occupant, such as the driver and/or passenger, the touchscreen interface 58 transmits a signal to the controller 40. As will be discussed, the controller 40 processes the signal, and determines a coordinate location of the touch or input on the touchscreen interface 58.

The display 54 comprises any suitable technology for displaying information, including, but not limited to, a liquid crystal display (LCD), organic light emitting diode (OLED), plasma, or a cathode ray tube (CRT). In this example, the display 54 is an electronic display capable of graphically displaying one or more user interfaces under the control of the controller 40. Those skilled in the art may realize other techniques to implement the display 54 in the vehicle 10.

In various embodiments, the one or more movable projectors 52 and the one or more stationary projectors 53 are disposed within a cabin 60 of the vehicle 10. In this example, the sun protection system 100 includes two movable projectors 52 and four stationary projectors 53 within the cabin 60, and each of the movable projectors 52 and the stationary projectors 53 are in communication with the controller 40 over a suitable communication medium. The movable projectors 52 include a first movable projector 52a and a second movable projector 52b. The stationary projectors 53 include a first stationary projector 53a, a second stationary projector 53b, a third stationary projector 53c and a fourth stationary projector 53d. In one example, the first movable projector 52a is coupled to an instrument panel 55 of the body 14 on a first or driver's side 62 of the vehicle 10; and the second movable projector 52b is coupled to the instrument panel 55 of the body 14 on a second or passenger's side 64 of the vehicle 10. It should be noted that these locations for the first movable projector 52a and the second movable projector 52b are merely exemplary, as the first movable projector 52a and the second movable projector 52b may be coupled at any desired location within the cabin 60, including, but not limited to, an A-pillar, a B-pillar, a head liner, etc. Moreover, the sun protection system 100 may include more than two projectors, and for example, may include one or more movable projectors 52 for each of the windows 20. As a further example, a head-up display unit associated with the vehicle 10 may comprise a projector for use with the sun protection system 100, if desired.

Figure 1A:
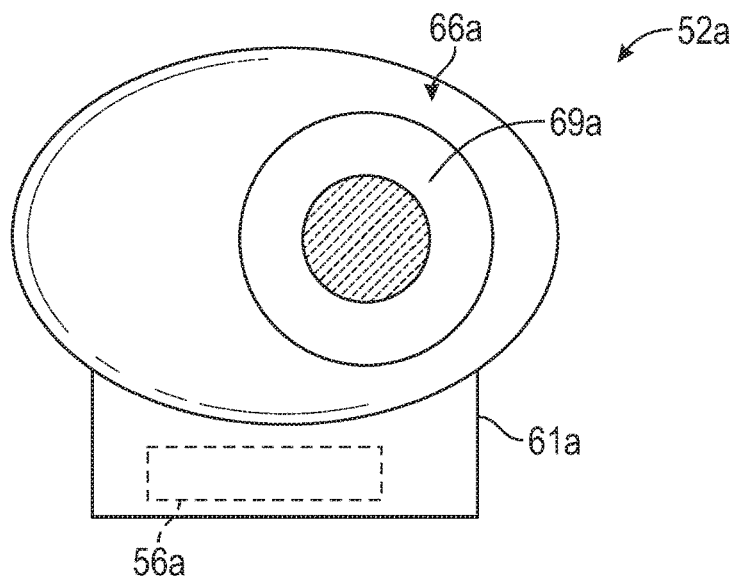
FIG. 1A illustrates an exemplary movable projector controlled by the sun protection system of FIG. 1, which outputs an image in accordance with various embodiments.

In this example, each of the first movable projector 52a and the second movable projector 52b includes a respective first motor 56a and a second motor 56b, and a first image output system 66a and a second image output system 66b. In one example, the first movable projector 52a and the second movable projector 52b are image projectors, and the first image output system 66a and the second image output system 66b are mounted on a movable platform 61a, 61b (FIG. 1A) that is rotatable about a Z-axis and a Y-axis associated with the vehicle 10. In one example, the movable platform 61a, 61b is a rotating base, having a first stationary portion coupled to the instrument panel 55 and a second rotatable portion that is movable relative to the first portion. The second portion of the movable platform 61a, 61b is coupled to the respective one of the first image output system 66a and the second image output system 66b such that a movement of the second portion of the movable platform 61a, 61b moves the respective one of the first image output system 66a and the second image output system 66b. Generally, a first projector lens 69a of the first image output system 66a and a second projector lens 69b of the second image output system 66b are each coupled to the second portion of the respective movable platform 61a, 61b. A size of the first projector lens 69a and the second projector lens 69a such as pico, nano or other size, may be determined based on the vehicle 10 and the packing space available within the vehicle 10.

The second portion of the movable platform 61a, 61b is driven by the respective one of the first motor 56a and the second motor 56b to orientate the first projector lens 69a of the first image output system 66a and the second projector lens 69b of the second image output system 66b, respectively, to project a respective image at a selected coordinate location of the window 20. The first motor 56a and the second motor 56b are responsive to one or more control signals from the controller 40 to move the movable platform 61a, 61b, and thus, the first image output system 66a and the second image output system 66b, relative to the cabin 60 of the vehicle 10 and relative to a respective one of the windows 20 of the vehicle 10. The first motor 56a and the second motor 56b may be coupled to the second portion of the respective movable platform 61a, 61b via gearing, including one or more bearings, etc., which when driven by the respective first motor 56a and the second motor 56b enable the second portion of the movable platform 61a, 61b to position the respective first image output system 66a and the second image output system 66b at the selected location along the Y-axis and/or Z-axis.

In one example, the first motor 56a and the second motor 56b are responsive to the one or more control signals from the controller 40 to rotate the movable platform 61a, 61b about the Z-axis and/or to rotate about the Y-axis to align the respective first image output system 66a and the second image output system 66b with a desired (Y, Z) coordinate location on the respective window 20, such as the windshield 20a. Stated another way, the window 20 is composed of a plurality of points that make up a coordinate grid, each having an (Y, Z, X) coordinate location.

Generally, the movable platforms 61a, 61b have a predefined range of motion. In one example, with reference to FIG. 2, the range of motion of the movable platform 61a is limited such that the image output by the first image output system 66a remains within about 0% to about 50% of a length L1 of the windshield 20a along the Y-axis; and the range of motion of the movable platform 61b is limited such that the image output by the second image output system 66b remains within about 50% to about 100% of the length L1 of the windshield 20a. Thus, the range of motion of the respective movable platforms 61a, 61b is limited such that the image generated by the respective movable projectors 52a, 52b remains on respective sides of a line W that extends along the Z-axis on the windshield 20a. The line W is generally a midpoint line, or a line that is at about 50% of the length L1 of the windshield 20a. By limiting the range of motion of each of the movable platforms 61a, 61b, the sun protection system 100 reduces a potential obstruction of the windshield 20a while providing for protection from the glare of the sun.

Figure 2:
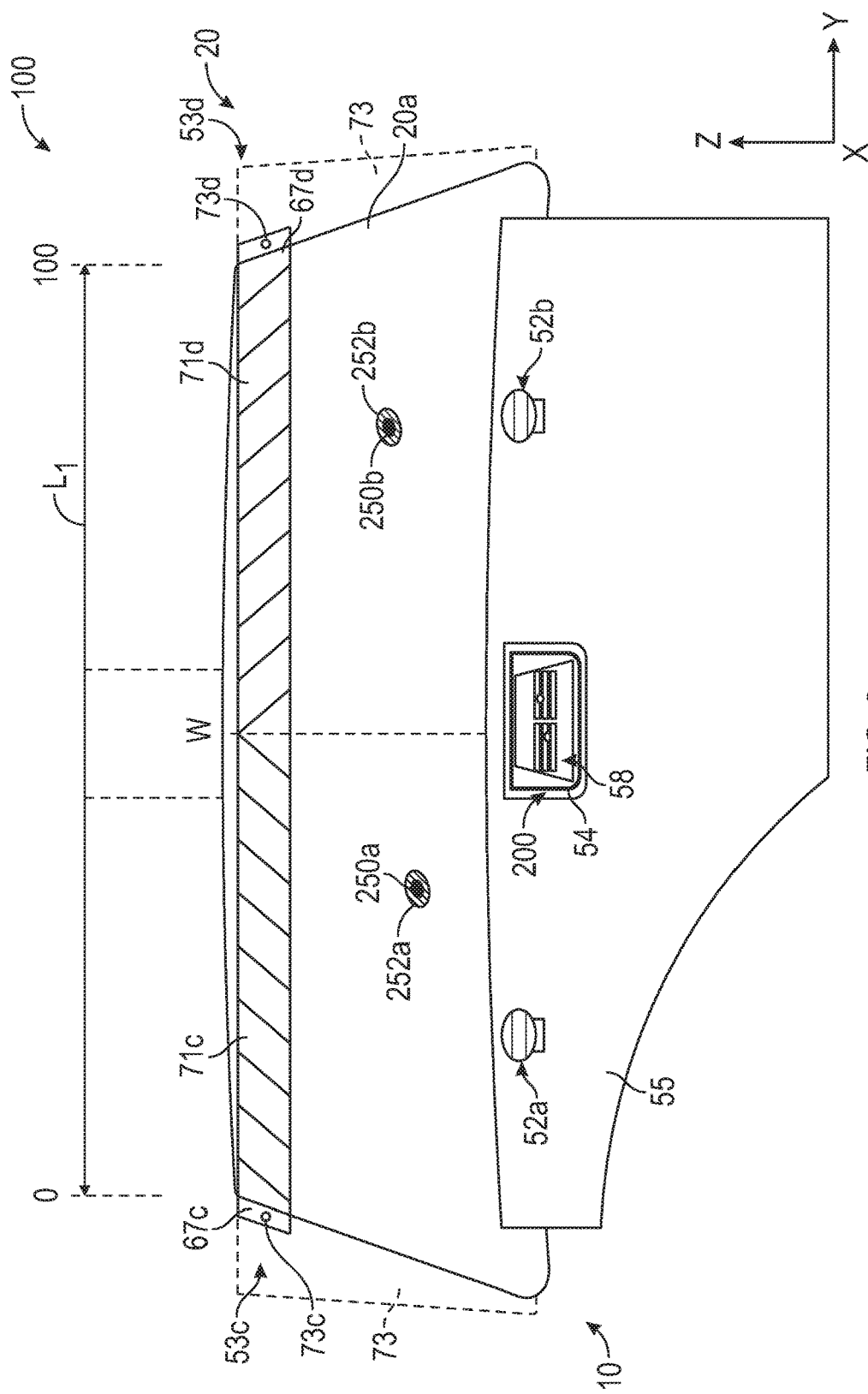
FIG. 2 illustrates an exemplary menu user interface rendered by the sun protection system on a display of a human-machine interface of the vehicle of FIG. 1, and also illustrates an exemplary first image and a second image output by the sun protection system to obstruct a glare of the sun on a window, in accordance with various embodiments.

The first image output system 66a and the second image output system 66b of the respective first movable projector 52a and the second movable projector 52b each output a first image and a second image, respectively. In one example, with reference to FIG. 1A, the first movable projector 52a is shown. As the second movable projector 52b is the same as the first movable projector 52a, for ease of the description, only one of the movable projectors 52 will be described herein. The first image output system 66a includes the first projector lens 69a. The first image output system 66a produces the image of an opaque circle overlaid on a translucent circle with the projector lens 69a. The first projector lens 69a is substantially circular, and when illuminated by a projector of the first image output system 66a, the first projector lens 69a outputs an opaque image overlaid onto a larger translucent or semi-opaque image, which are both cylindrical in shape resulting in the formation of circles on the window, such as the windshield 20a (FIG. 2). Generally, the translucent or semi-opaque portion of the image is projected by the first projector lens 69a such that it surrounds the opaque portion of the image. In various embodiments, the semi-opaque portion of the image and the opaque portion of the image form concentric circles on the window 20. Thus, in this example, the first projector lens 69a outputs the images of the circles, with the opaque portion of the image having a diameter of about 10 millimeters (mm) (or other diameter) and outputs the translucent or semi-opaque portion of the image, which has a diameter of about 20 millimeters (mm) (or other diameter). The opaque portion of the image obscures or blocks the glare of the sun on the window 20. The semi-opaque portion of the image projected by the second projector lens 69b diffuses the glare of the sun and minimizes the residual glare that extends beyond the opaque portion of the image projected by the first projector lens 69a. In one example, the opaque portion of the image is a black circle, and the semi-opaque portion of the image is a semi-transparent gray circle.

In the example of the first movable projector 52a and the second movable projector 52b comprising image projectors, the first image output system 66a and the second image output system 66b each includes, but is not limited to, one of a Liquid Crystal on Silicon (LCoS) display, Ferroelectric Liquid Crystal on Silicon (FLCoS) display, Digital Light Processing (DLP), laser beam steering (LBS), etc. The first image output system 66a and the second image output system 66b are each responsive to one or more control signals from the controller 40 to each substantially simultaneously generate the opaque and semi-opaque portion of the image. It should be noted that the use of a single movable projector to output two different portions of an image (i.e. an opaque image and a semi-opaque image) is merely an example, as multiple movable projectors may be employed to output the opaque image and the semi-opaque image.

Figure 1B:
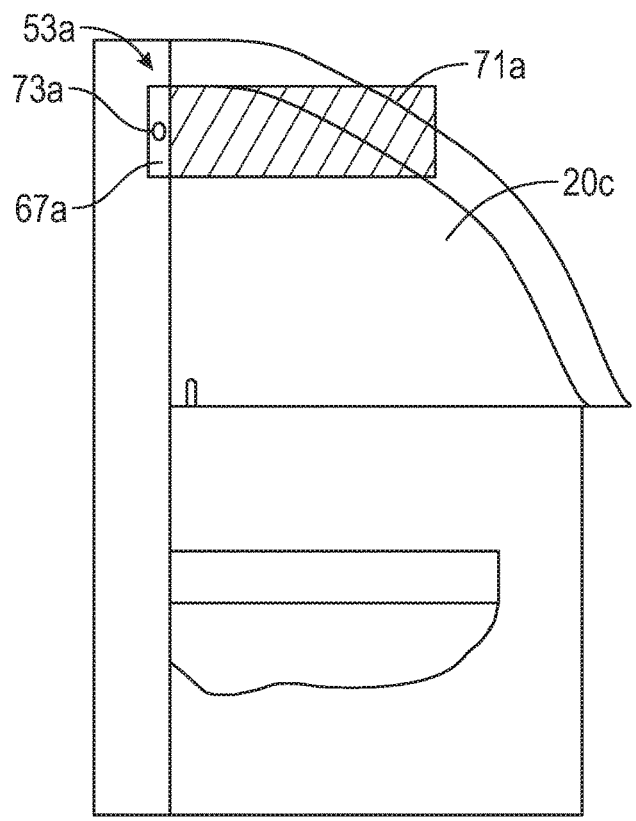
FIG. 1B illustrates an exemplary stationary projector controlled by the sun protection system of FIG. 1, which outputs an image that defines a visor in accordance with various embodiments.

In one example, each of the first stationary projector 53a, the second stationary projector 53b, the third stationary projector 53c and the fourth stationary projector 53d each include a respective first image bar output system 67a, second image bar output system 67b, third image bar output system 67c and fourth image bar output system 67d. In this example, each of the first stationary projector 53a, the second stationary projector 53b, the third stationary projector 53c and the fourth stationary projector 53d are rectangular systems comprised of a pico or nano projector having a projector lens, such as the projector lens 73a shown in FIG. 1B, and are mounted on a respective pillar of the body 14 of the vehicle 10 (projector lens 73c and 73d are shown in FIG. 2). The first stationary projector 53a, the second stationary projector 53b, the third stationary projector 53c and the fourth stationary projector 53d each output a single image of a translucent or semi-opaque rectangle. Each of the first stationary projector 53a, the second stationary projector 53b, the third stationary projector 53c and the fourth stationary projector 53d are coupled to the respective pillar such that the first image bar output system 67a, the second image bar output system 67b, the third image bar output system 67c and the fourth image bar output system 67d are each at a fixed location within the cabin of the vehicle 10 and are fixed relative to a respective one of the windows 20 of the vehicle 10. In one example, the first stationary projector 53a and the second stationary projector 53b are coupled to a respective one of the B-pillars of the body 14 of the vehicle 10 for diffusing the glare of the sun through respective side windows 20c (FIG. 1). The third stationary projector 53c and the fourth stationary projector 53d are coupled to a respective one of the A-pillars 73 (FIG. 2) of the body 14 of the vehicle 10 for diffusing the glare of the sun through respective portions of the windshield 20a.

The first image bar output system 67a, the second image bar output system 67b, the third image bar output system 67c and the fourth image bar output system 67*d* of the respective one of the first stationary projector 53*a*, the second stationary projector 53*b*, the third stationary projector 53*c* and the fourth stationary projector 53*d* each generate and output a respective image 71*a*-71*d*, which defines an image bar or visor. As used herein, an "image bar" denotes a projected image that has a pre-defined width and a pre-defined length. Generally, each of the images 71*a*-71*d* output by the respective one of the first image bar output system 67*a*, the second image bar output system 67*b*, the third image bar output system 67*c* and the fourth image bar output system 67*d* form a visor, which substantially obscures the glare of the sun through the respective window 20. In various embodiments, the images 71*a*-71*d* output by the respective one of the first image bar output system 67*a*, the second image bar output system 67*b*, the third image bar output system 67*c* and the fourth image bar output system 67*d* are semi-opaque or opaque pictures or images of a rectangle, such as a semi-opaque gray rectangle, which obscure the glare of the sun. In one example, with reference to FIG. 1B, the first stationary projector 53*a* is shown to output the image 71*a* with the projector lens 73*a* on the side window 20*c*. It should be understood that the second stationary projector 53*b*, the third stationary projector 53*c* and the fourth stationary projector 53*d* are each the same as the first stationary projector 53*a*. Thus, the image 71*b* output by the second stationary projector 53*b* on the side window 20*c* associated with the passenger's side 64 is the same as the image 71*a* output by the first stationary projector 53*a*. The images 71*c*, 71*d* output by the respective one of the third stationary projector 53*c* and the fourth stationary projector 53*d* are shown in FIG. 2.

In one exemplary configuration of the vehicle 10, the respective image 71*a*-71*d* output by the first image bar output system 67*a*, second image bar output system 67*b*, the third image bar output system 67*c* and the fourth image bar output system 67*d* is substantially semi-opaque, and has a width of about 9 inches and a length of about 16 inches to diffuse the glare of the sun along the respective window 20. Generally, the first image bar output system 67*a*, the second image bar output system 67*b*, the third image bar output system 67*c* and the fourth image bar output system 67*d* output the image to cover a portion of the window 20 that would typically be covered by a movable overhead visor. With reference to FIG. 2, the third image bar output system 67*c* and the fourth image bar output system 67*d* of the respective the third stationary projector 53*c* and the fourth stationary projector 53*d* cooperate to diffuse the glare of the sun along a top portion of the windshield 20*a*.

In the example of each of the first stationary projector 53*a*, the second stationary projector 53*b*, the third stationary projector 53*c* and the fourth stationary projector 53*d* as nano or pico projectors, the first image bar output system 67*a*, the second image bar output system 67*b*, the third image bar output system 67*c* and the fourth image bar output system 67*d* each includes, but is not limited to, one of a Liquid Crystal on Silicon (LCoS) display, Ferroelectric Liquid Crystal on Silicon (FLCoS) display, Digital Light Processing (DLP), laser beam steering (LBS), etc. The first image bar output system 67*a*, the second image bar output system 67*b*, the third image bar output system 67*c* and the fourth image bar output system 67*d* are each responsive to one or more control signals from the controller 40 to each generate the semi-opaque images.

As discussed above, the sun protection system 100 receives input from an occupant of the vehicle 10 for sun protection. Based on the input, the sun protection system 100 generates menu user interface data for rendering a menu user interface on the display 54 and receives input to the touchscreen interface 58 that overlays the menu user interface. Based on the user's interaction with the menu user interface, the sun protection system 100 generates driver or passenger selection user interface data for rendering a driver or passenger selection user interface on the display 54 of the human-machine interface 50. The occupant touches or provides an input to the touchscreen interface 58 that overlays the driver or passenger selection user interface and the sun protection system 100 determines a selection coordinate value based on the input to the touchscreen interface 58. The sun protection system 100, based on the selection coordinate value, determines a coordinate location (Y, Z, X) on the window 20 for which sun protection is desired. The sun protection system 100 determines, from the coordinate location on the window, a position for the first movable projector 52*a* or a position for the second movable projector 52*b* that aligns the first image output system 66*a* or the second image output system 66*b*, and thus, the respective first image or the second image, with the selected window coordinate location. The sun protection system 100 outputs one or more control signals to the first motor 56*a* or the second motor 56*b* to move the movable platform 61*a* or the movable platform 61*b*, respectively, based on this determination, and also outputs one or more control signals to the first image output system 66*a* or the second image output system 66*b* to generate the first image and the second image, respectively.

In addition, based on the input to the touchscreen interface 58 that overlays the menu user interface, the sun protection system 100 determines whether input has been received selecting the generation of one or more of the visors by one or more of the stationary projectors 53*a*-53*d*. Based on the input to the touchscreen interface 58, the sun protection system 100 determines which visor has been selected. The sun protection system 100 outputs one or more control signals to the first image bar output system 67*a*, the second image bar output system 67*b*, the third image bar output system 67*c* and the fourth image bar output system 67*d* to generate the respective image 71*a*-71*d*.

Figure 3:
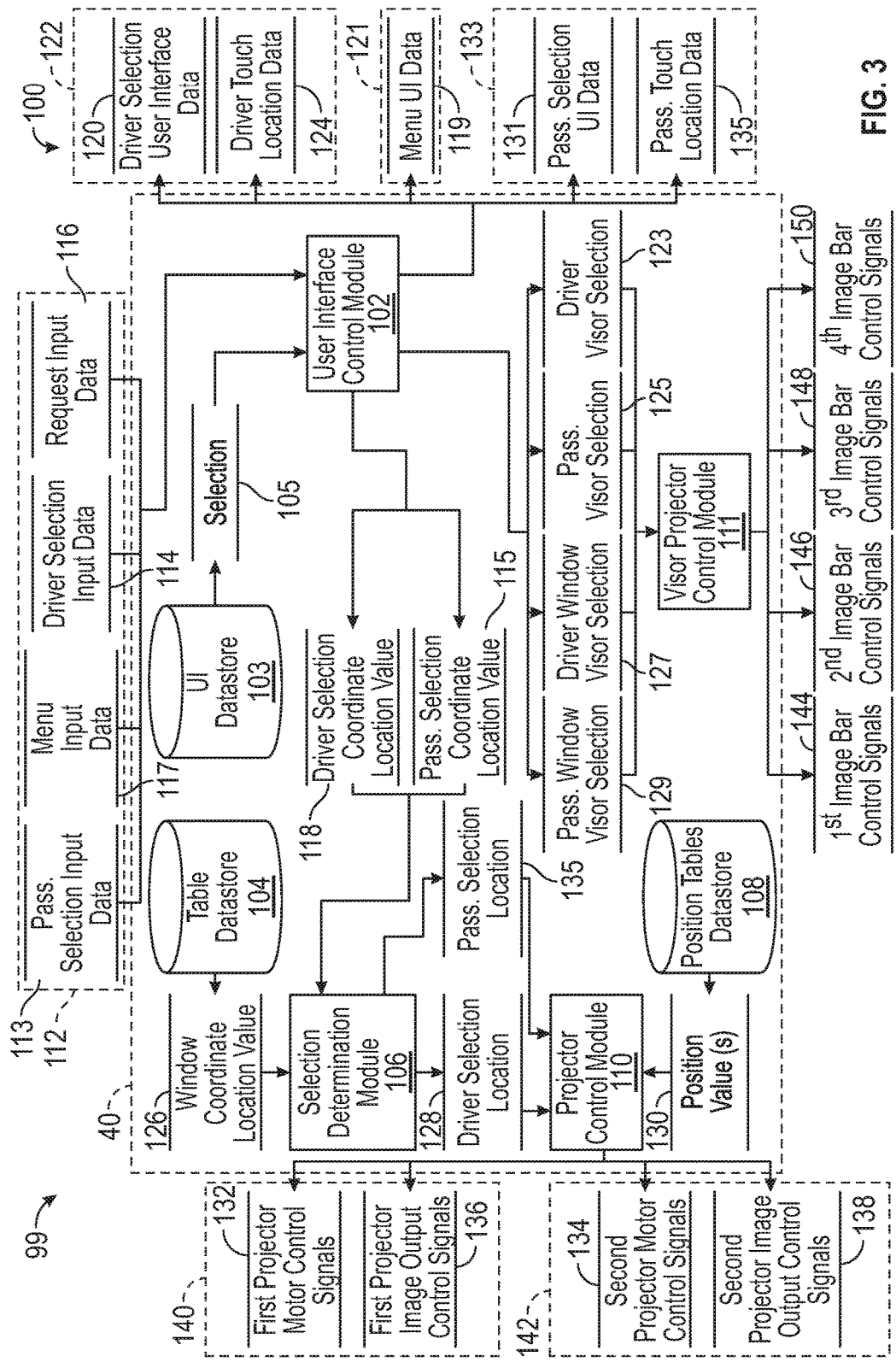
FIG. 3 is a dataflow diagram illustrating the sun protection system of the vehicle of FIG. 1, in accordance with various embodiments.

For example, as shown in more detail with regard to FIG. 3 and with continued reference to FIG. 1, a dataflow diagram illustrates various embodiments of a control system 99 of the sun protection system 100 for the vehicle 10, which may be embedded within the controller 40. Various embodiments of the sun protection system 100 according to the present disclosure can include any number of sub-modules embedded within the controller 40. As can be appreciated, the sub-modules shown in FIG. 3 can be combined and/or further partitioned to similarly control the movable projectors 52 and the stationary projectors 53. Inputs to the sun protection system 100 may be received from the human-machine interface 50 (FIG. 1), received from other control modules (not shown) associated with the vehicle 10, and/or determined/modeled by other sub-modules (not shown) within the controller 40. In various embodiments, the sun protection system 100 includes a user interface (UI) control module 102, a UI datastore 103, a table datastore 104, a selection determination module 106, a position tables datastore 108, a projector control module 110 and a visor projector control module 111.

Figure 4:
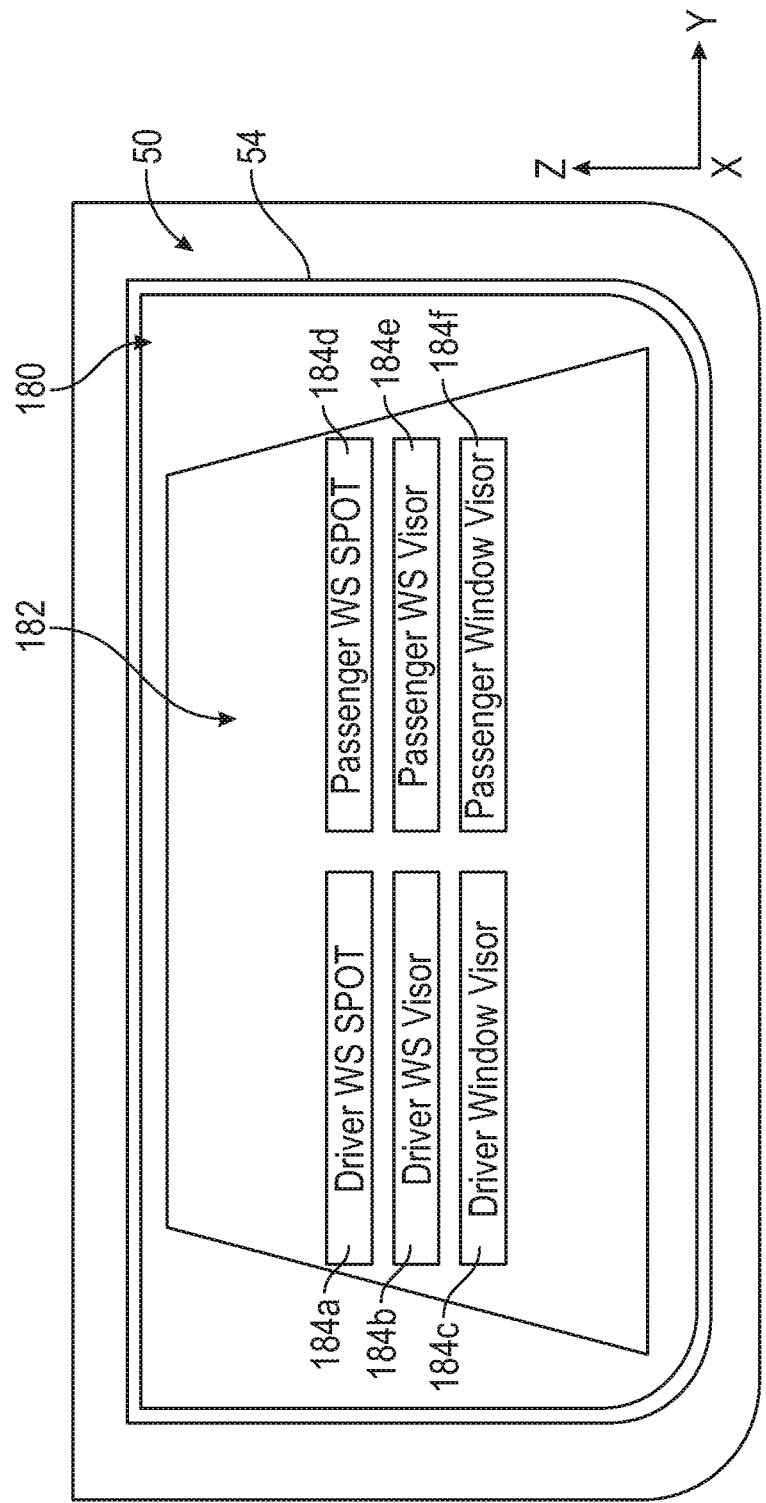
FIG. 4 illustrates an exemplary menu user interface rendered by the sun protection system on the display of the human-machine interface of the vehicle of FIG. 1, in accordance with various embodiments.

The UI datastore 103 stores a coordinate location associated with a respective one of a plurality of selections for sun protection. The UI datastore 103 stores a correlation table that correlates the (Y,Z) coordinate value for the location touched by the occupant on a menu user interface 180 (FIG. 4) to a selection for sun protection. Thus, the UI datastore 103 stores one or more lookup tables, which provide a selection 105 that corresponds with the (Y,Z) coordinate value touched by the occupant on the menu user interface 180 (FIG. 4). The selections 105 stored in the UI datastore 103 are each a predefined (Y,Z) coordinate location or predefined range of coordinate locations (Y,Z) of the touchscreen interface 58 that correspond to a respective selection 105 for sun protection.

For example, the UI datastore 103 stores a predefined (Y,Z) coordinate location or range of (Y,Z) coordinate locations that correspond with input received to select a "Driver Windshield Spot" or the selection 105 of sun protection by the first movable projector 52a. The UI datastore 103 stores a predefined (Y,Z) coordinate location or a range of (Y,Z) coordinate locations that correspond with input received to select a "Driver Windshield Visor" or the selection 105 of sun protection by the third stationary projector 53c. The UI datastore 103 stores a predefined (Y,Z) coordinate location or a range of (Y,Z) coordinate locations that correspond with input received to select a "Driver Window Visor" or the selection 105 of sun protection by the first stationary projector 53a. The UI datastore 103 stores a predefined (Y,Z) coordinate location or a range of (Y,Z) coordinate locations that correspond with input received to select a "Passenger Windshield Spot" or the selection 105 of sun protection by the second movable projector 52b. The UI datastore 103 stores a predefined (Y,Z) coordinate location or a range of (Y,Z) coordinate locations that correspond with input received to select a "Passenger Windshield Visor" or the selection 105 of sun protection by the fourth stationary projector 53d. The UI datastore 103 stores a predefined (Y,Z) coordinate location or a range of (Y,Z) coordinate locations that correspond with input received to select a "Passenger Window Visor" or the selection 105 of sun protection by the second stationary projector 53b.

The UI control module 102 receives input data 112. The input data 112 is received from an occupant's interaction with the human-machine interface 50. In this example, the input data 112 comprises driver selection input data 114, passenger selection data 113, request input data 116 and menu input data 117. The driver selection input data 114 is one or more signals from the touchscreen interface 58 received based on the user's interaction with the touchscreen interface 58 overlaying a driver selection user interface 122 rendered on the display 54. The passenger selection input data 113 is one or more signals from the touchscreen interface 58 received based on the user's interaction with the touchscreen interface 58 overlaying a passenger selection user interface 133 rendered on the display 54. The menu input data 117 is one or more signals from the touchscreen interface 58 received based on the user's interaction with the touchscreen interface 58 overlaying a menu user interface 121. The UI control module 102 processes the one or more signals, and determines an (Y,Z) coordinate value for the location of the input received to the touchscreen interface 58.

In this regard, in the example of a projected capacitive touchscreen, conductors generally run at right angles to each other and the conductors in each layer are separate such that a capacitance of each conductor is measured separately and the measurement signals are output from the touchscreen interface 58 to the UI control module 102. The UI control module 102 processes these signals from the touchscreen interface 58 and determines the (Y,Z) coordinate value for the location that is touched by the occupant on the respective one of the driver selection user interface 122, the passenger selection user interface 133 and the menu user interface 121 rendered on the touchscreen interface 58. In the example of a sliding touch or input received to the touchscreen interface 58 over a series of substantially connected points, the UI control module 102 may process the last known input (i.e. the end of the travel of the user's motion along the touchscreen interface 58) to determine the coordinate location of the touch input to the respective one of the driver selection user interface 122, the passenger selection user interface 133 and the menu user interface 121 on the touchscreen interface 58. Although embodiments are discussed herein with regard to a touchscreen or the touchscreen interface 58 as an exemplary human-machine interface, other user input devices may provide input data in various embodiments.

The UI control module 102 also receives as input the request input data 116. The request input data 116 is a request for sun protection, which is received from the human-machine interface 50. Based on the receipt of the request input data 116, the UI control module 102 generates menu user interface data 119 for rendering a menu user interface 121 on the display 54 of the human-machine interface 50. The menu user interface data 119 includes a graphical representation of a menu that provides selections for sun protection for rendering on the display 54.

In one example, with reference to FIG. 4, an exemplary menu user interface 180 is shown displayed on the display 54 of the human-machine interface 50. The human-machine interface 50 is coupled to the instrument panel 55 of the vehicle 10. The menu user interface 180 includes a graphical representation 182a-f of various sun protection selections 184a-f, which are labelled with text. In this example, the graphical representation 182a-f are a plurality of buttons, each button corresponding to a respective one of the sun protection selections 184a-f. In one example, the sun protection selection 184a is labeled "Driver Windshield Spot" to denote a selection of sun protection by the first movable projector 52a. The sun protection selection 184b is labeled "Driver Windshield Visor" to denote a selection of sun protection by the third stationary projector 53c. The sun protection selection 184c is labeled "Driver Window Visor" to denote a selection of sun protection by the first stationary projector 53a. The sun protection selection 184d is labeled "Passenger Windshield Spot" to denote a selection of sun protection by the second movable projector 52b. The sun protection selection 184e is labeled "Passenger Windshield Visor" to denote a selection of sun protection by the fourth stationary projector 53d. The sun protection selection 184f is labeled "Passenger Window Visor" to denote a selection of sun protection by the second stationary projector 53b. Each of the sun protection selections 184a-f have a known or predefined coordinate location or range of coordinate locations with respect to the touchscreen interface 58, which is stored in the UI datastore 103.

With reference back to FIG. 3, the UI control module 102 also receives as input the menu input data 117. The menu input data 117 is input received to the menu user interface 121 from an occupant's interaction with the human-machine interface 50, such as input received to the touchscreen interface 58 overlying the menu user interface 121 that selects one or more of the sun projection selections 184a-f (FIG. 4). The UI control module 102 processes these signals from the touchscreen interface 58 and determines the (Y, Z) coordinate value for the location that is touched by the occupant.

Based on the coordinate value received in the menu input data 117, the UI control module 102 queries the UI datastore 103 and retrieves the selection 105 from the UI datastore 103 that corresponds with the (Y,Z) coordinate value for the location associated with the menu input data 117. Based on the retrieved selection 105 of "Driver Windshield Spot" (sun protection selection 184a; FIG. 4) or a selection of sun protection by the first movable projector 52a, the UI control module 102 processes the retrieved selection 105 and outputs driver selection user interface data 120 for rendering the driver selection user interface 122 on the display 54 of the human-machine interface 50. The driver selection user interface data 120 includes a graphical representation of a window for which sun protection is desired for rendering on the display 54. In one example, the graphical representation is of the windshield 20a. The driver selection user interface 122 may also include driver touch location data 124. The driver touch location data 124 includes the (Y,Z) coordinate value for the location that is touched by the driver along with an icon for superimposing on the driver selection user interface data 120 at the location touched by the driver to visually indicate to the driver the touched location.

Figure 4A:
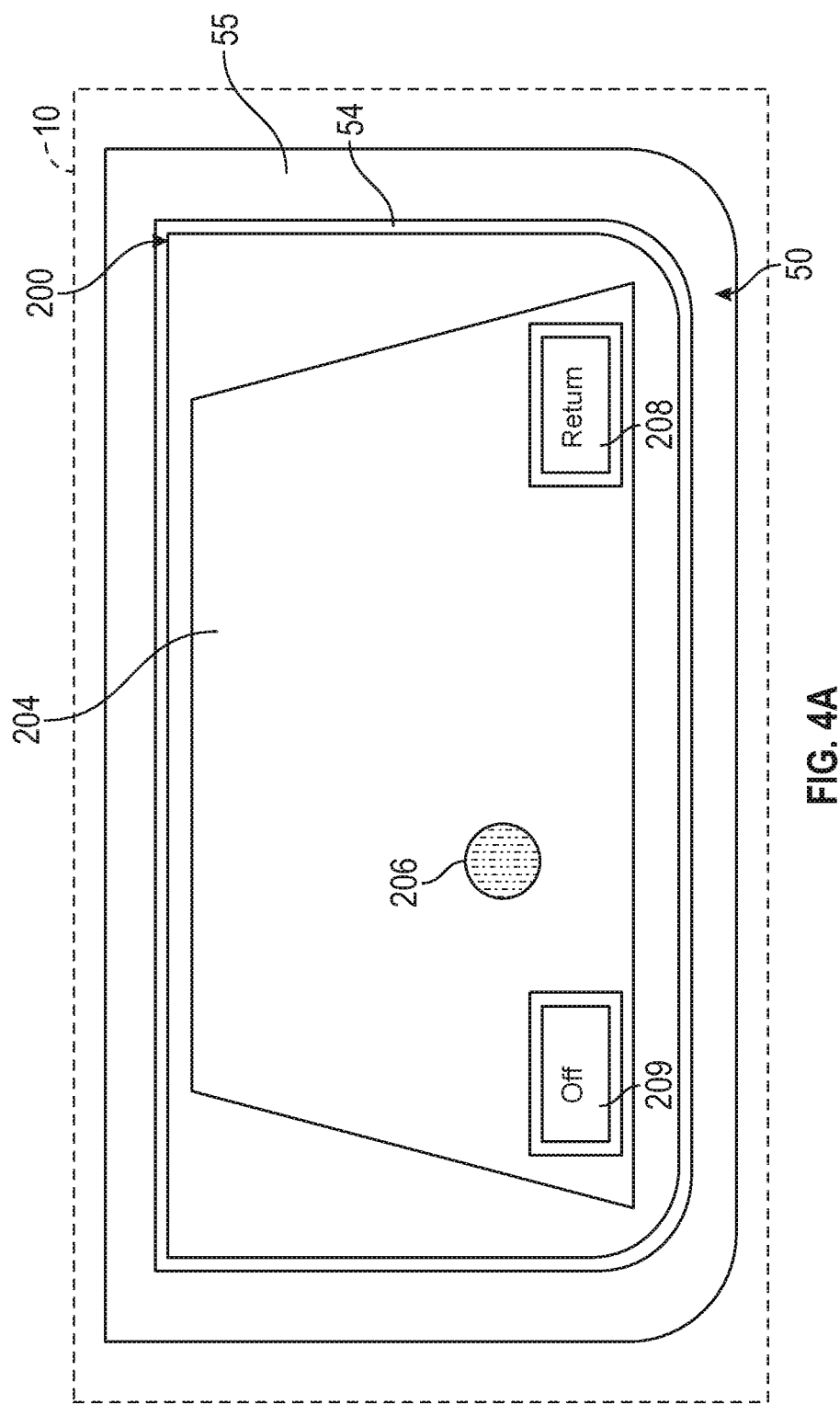
FIG. 4A illustrates an exemplary driver selection user interface rendered by the sun protection system on the display of the human-machine interface of the vehicle of FIG. 1, in accordance with various embodiments.

In one example, with reference to FIG. 4A, an exemplary driver selection user interface 200 is shown displayed on the display 54 of the human-machine interface 50. The human-machine interface 50 is coupled to the instrument panel 55 of the vehicle 10. The driver selection user interface 200 includes a graphical representation 204 of a window, which corresponds with the window 20 for which sun protection is requested from the driver selection user interface data 120. In this example, the graphical representation 204 is of the windshield 20a. The driver selection user interface 200 also includes icon 206, which indicates the location on the touchscreen interface 58 touched by the driver. The icon 206 is superimposed over the graphical representation 204. The driver selection user interface 200 may also include an icon to return to the menu user interface 121, such as a return icon 208, which may include, but is not limited to a graphical representation of a button labelled "Return," a graphical representation of a return arrow, etc. In various embodiments, the driver selection user interface 200 may also include an icon to end sun protection, such as an off icon 209, which may include, but is not limited to a graphical representation of a button labelled "OFF," a graphical representation of a no symbol, etc.

With reference back to FIG. 3, the UI control module 102 receives as input the driver selection input data 114. The driver selection input data 114 is input received to the driver selection user interface 122 from an occupant's interaction with the human-machine interface 50, such as input received to the touchscreen interface 58 overlying the driver selection user interface 122 that selects a location on the window 20 for sun protection (FIG. 4A). The UI control module 102 processes these signals from the touchscreen interface 58 and determines the (Y, Z) coordinate value for the location that is touched by the occupant. The UI control module 102 sets this determined coordinate value for the location touched as the driver selection coordinate location value 118.

Based on the retrieved selection 105 of "Driver Windshield Visor" (sun protection selection 184b; FIG. 4) or a selection of sun protection by the third stationary projector 53c, the UI control module 102 processes the retrieved selection 105 and sets driver visor selection 123 for the visor projector control module 111. Based on the retrieved selection 105 of "Driver Window Visor" (sun protection selection 184c; FIG. 4) or a selection of sun protection by the first stationary projector 53a, the UI control module 102 processes the retrieved selection 105 and sets driver window visor selection 125 for the visor projector control module 111.

Based on the retrieved selection 105 of "Passenger Windshield Spot" (sun protection selection 184d; FIG. 4) or a selection of sun protection by the second movable projector 52b, the UI control module 102 processes the retrieved selection 105 and outputs passenger selection user interface data 131 for rendering a passenger selection user interface 133 on the display 54 of the human-machine interface 50. The passenger selection user interface data 131 includes a graphical representation of a window for which sun protection is desired for rendering on the display 54. In one example, the graphical representation is of the windshield 20a. The passenger selection user interface 133 may also include passenger touch location data 135. The passenger touch location data 135 includes the (Y,Z) coordinate value for the location that is touched by the passenger along with an icon for superimposing on the passenger selection user interface data 131 at the location touched by the passenger to visually indicate to the passenger the touched location.

Figure 4B:
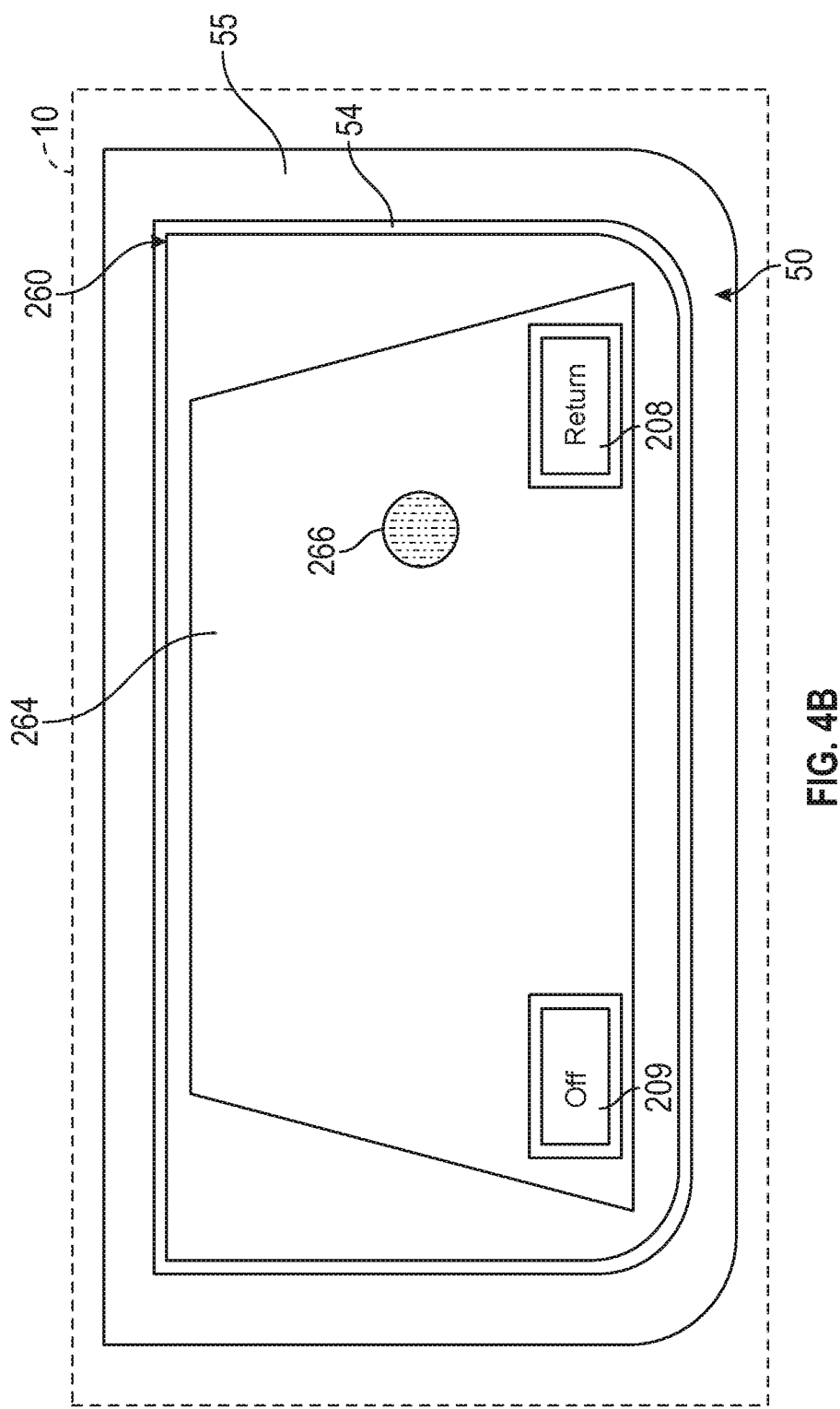
FIG. 4B illustrates an exemplary passenger selection user interface rendered by the sun protection system on the display of the human-machine interface of the vehicle of FIG. 1, in accordance with various embodiments.

In one example, with reference to FIG. 4B, an exemplary passenger selection user interface 260 is shown displayed on the display 54 of the human-machine interface 50. The human-machine interface 50 is coupled to the instrument panel 55 of the vehicle 10. The driver selection user interface 260 includes the graphical representation 264 of a window, which corresponds with the window 20 for which sun protection is requested from the passenger selection user interface data 131. In this example, the graphical representation 264 is of the windshield 20a. The passenger selection user interface 260 also includes icon 266, which indicates the location on the touchscreen interface 58 touched by the passenger. The icon 266 is superimposed over the graphical representation 264. The passenger selection user interface 260 may also include an icon to return to the menu user interface 121, such as the return icon 208. In various embodiments, the passenger selection user interface 260 may also include an icon to end sun protection, such as the off icon 209. It should be noted that while the selection user interface is described and illustrated herein as including the driver selection user interface 200 for the driver's side and the passenger selection interface 260 for the passenger's side for the selection of the location of the sun protection by the movable projectors 52a, 52b, it will be understood that the sun protection system 100 may output a single selection user interface to enable the driver and the passenger to select a location for sun protection by the respective first movable projector 52a and the second movable projector 52b.

With reference back to FIG. 3, the UI control module 102 receives as input the passenger selection input data 113. The passenger selection input data 113 is input received to the passenger selection user interface 131 from an occupant's interaction with the human-machine interface 50, such as input received to the touchscreen interface 58 overlying the passenger selection user interface 131 that selects a location on the window 20 for sun protection (FIG. 4B). The UI control module 102 processes these signals from the touchscreen interface 58 and determines the (Y, Z) coordinate value for the location that is touched by the occupant. The UI control module 102 sets this determined coordinate value for the location touched as the passenger selection coordinate location value 115.

Based on the retrieved selection 105 of "Passenger Windshield Visor" (sun protection selection 184e; FIG. 4) or a selection of sun protection by the fourth stationary projector 53d, the UI control module 102 processes the retrieved selection 105 and sets passenger visor selection 127 for the visor projector control module 111. Based on the retrieved selection 105 of "Passenger Window Visor" (sun protection selection 184f; FIG. 4) or a selection of sun protection by the second stationary projector 53b, the UI control module 102 processes the retrieved selection 105 and sets passenger window visor selection 129 for the visor projector control module 111.

The table datastore 104 stores a correlation table that correlates the (Y,Z) coordinate value for the location touched by the occupant to a (Y, Z, X) coordinate on the window 20 for which sun protection is desired. Thus, the table datastore 104 stores one or more lookup tables, which provide a window coordinate location value 126 that corresponds with the (Y,Z) coordinate value for the location touched by the occupant (driver and passenger). The window coordinate location values 126 stored in the table datastore 104 are each predefined, and in one example, the window coordinate location value 126 may have a one to one correspondence with the (Y,Z) coordinate location value received from the driver selection input data 114 and a one to one correspondence with the (Y,Z) coordinate location value received from the passenger selection input data 115. Stated another way, each (Y,Z) coordinate location of the touchscreen interface 58 may correspond directly to a respective (Y, Z, X) coordinate location of the respective window 20.

The selection determination module 106 receives as input the driver selection coordinate location value 118, which is the (Y,Z) coordinate value for the location touched by the occupant when the driver selection user interface 122 is rendered on the display 54. Based on the driver selection coordinate location value 118, the selection determination module 106 retrieves the corresponding window coordinate location value 126 from the table datastore 104. The selection determination module 106 processes the window coordinate location value 126 and outputs the (Y,Z) coordinates from the window coordinate location value 126 as a driver selection location 128 for the projector control module 110.

The selection determination module 106 receives as input the passenger selection coordinate location value 115, which is the (Y,Z) coordinate value for the location touched by the occupant when the passenger selection user interface 133 is rendered on the display 54. Based on the passenger selection coordinate location value 115, the selection determination module 106 retrieves the corresponding window coordinate location value 126 from the table datastore 104. The selection determination module 106 processes the window coordinate location value 126 and outputs the (Y,Z) coordinates from the window coordinate location value 126 as a passenger selection location 135 for the projector control module 110.

The position tables datastore 108 stores one or more look-up tables that provide a position for the movable platform 61a, 61b of the first movable projector 52a and the second movable projector 52b to substantially align the first image output system 66a and the second image output system 66b with the respective one of the driver selection location 128 and the passenger selection location 135. In this regard, the first movable projector 52a is associated with coordinate locations (Y,Z) from about 0% to about 50% of the length L1 along the Y-axis and the second movable projector 52b is associated with coordinate locations (Y,Z) from about 50% to about 100% of the length L1 along the Y-axis. For each coordinate location (Y,Z) of the window, the position tables datastore 108 stores position values 130 for controlling a movement of the first motor 56a or the second motor 56b to move the respective movable platform 61a, 61b to substantially align or center the image from the first image output system 66a or the second image output system 66b with the (Y, Z) coordinate location identified from the window coordinate location value 126 that is associated with the respective one of the first movable projector 52a and the second movable projector 52b. The position values 130 are each predefined and may comprise one or more calibrated values. As the movable platforms 61a, 61b are each movable about the Y-axis and the Z-axis, the position values 130 may comprise values for commanding the respective one of the first motor 56a and the second motor 56b to move the respective movable platform 61a, 61b about the Y-axis and/or Z-axis to position the respective first image output system 66a and the second image output system 66b at the selected location. In one example, the position tables datastore 108 stores one or more look-up tables that provide the position values 130 for one of the first motor 56a and the second motor 56b based on the coordinate location (Y,Z) received.

The projector control module 110 receives as input the driver selection location 128. The projector control module 110 queries the position tables datastore 108 and retrieves the position values 130 for the first motor 56a based on the driver selection location 128. Based on the retrieved position values 130, the projector control module 110 generates and outputs first projector motor control signals 132. The first projector motor control signals 132 comprise one or more control signals for the first motor 56a of the first movable projector 52a to move the movable platform 61a relative to the Y-axis and/or Z-axis to substantially align the first image of the first image output system 66a with the selected location on the window 20. Based on the retrieval of the position values 130, the projector control module 110 also generates and outputs first projector image output control signals 136. The first projector image output control signals 136 comprise one or more control signals for the first image output system 66a of the first movable projector 52a to output the first image onto the window 20.

The projector control module 110 receives as input the passenger selection location 135. The projector control module 110 queries the position tables datastore 108 and retrieves the position values 130 for the second motor 56b based on the passenger selection location 135. Based on the retrieved position values 130, the projector control module 110 generates and outputs second projector motor control signals 134. The second projector motor control signals 134 comprise one or more control signals for the second motor 56b of the second movable projector 52b to move the movable platform 61b relative to the Y-axis and/or Z-axis to substantially align the second image of the second image output system 66b with the selected location on the window 20. Based on the retrieval of the position values 130, the projector control module 110 also generates and outputs second projector image output control signals 138. The second projector image output control signals 138 comprise one or more control signals for the second image output system 66b of the second movable projector 52b to output the second image onto the window 20.

For example, with reference back to FIG. 2, the windshield 20a is shown with an exemplary first image having an opaque portion 250a and a semi-opaque portion 252a from the first image output system 66a; and an exemplary second image having an opaque portion 250b and a semi-opaque portion 252b from the second image output system 66b. The semi-opaque portions 252a, 252b overlap the opaque portions 250a, 250b of the image that are output through the respective first projector lens 69a and the second projector lens 69a, resulting in substantially concentric circles on the windshield 20a. The opaque portion 250a, 250b of the images block the glare of the sun, while not obstructing a view of the driver and/or passenger out of the windshield 20a. The semi-opaque portions 252a, 252b of images are larger than the opaque portion 250a, 250b of the images and further diffuse the glare of the sun, also while not obstructing the view of the driver and/or passenger out of the windshield 20a. In this example, the portions 250a, 252a of the first image are projected by the first movable projector 52a onto the location that corresponds with the input to the touchscreen interface 58 that is represented by the icon 206. The portions 250b, 252b of the second image are projected by the second movable projector 52b onto the location that corresponds with the input to the touchscreen interface 58 that is represented by the icon 266. Generally, the sun protection system 100 is limited to outputting one of the first images (having portions 250a, 252a) and one of the second images (having portions 250b, 252b) to avoid reducing a view out of the respective window 20, such as the windshield 20a.

With reference back to FIG. 3, the visor projector control module 111 receives as input the driver window visor selection 125. Based on the driver window visor selection 125, the visor projector control module 111 generates and outputs first image bar control signals 144. The first image bar control signals 144 are one or more control signals for the first image bar output system 67a of the first stationary projector 53a to output the image 71a to define the visor on the respective side window 20c.

The visor projector control module 111 receives as input the passenger window visor selection 129. Based on the passenger window visor selection 129, the visor projector control module 111 generates and outputs second image bar control signals 146. The second image bar control signals 146 are one or more control signals for the second image bar output system 67b of the second stationary projector 53b to output the image 71b to define the visor on the respective side window 20c.

The visor projector control module 111 receives as input the driver visor selection 123. Based on the driver visor selection 123, the visor projector control module 111 generates and outputs third image bar control signals 148. The third image bar control signals 148 are one or more control signals for the third image bar output system 67c of the third stationary projector 53c to output the image 71c to define the visor on the windshield 20a.

The visor projector control module 111 receives as input the passenger window visor selection 129. Based on the passenger window visor selection 129, the visor projector control module 111 generates and outputs fourth image bar control signals 150. The fourth image bar control signals 150 are one or more control signals for the fourth image bar output system 67d of the fourth stationary projector 53d to output the image 71d to define the visor on the windshield 20a.

Figure 5:
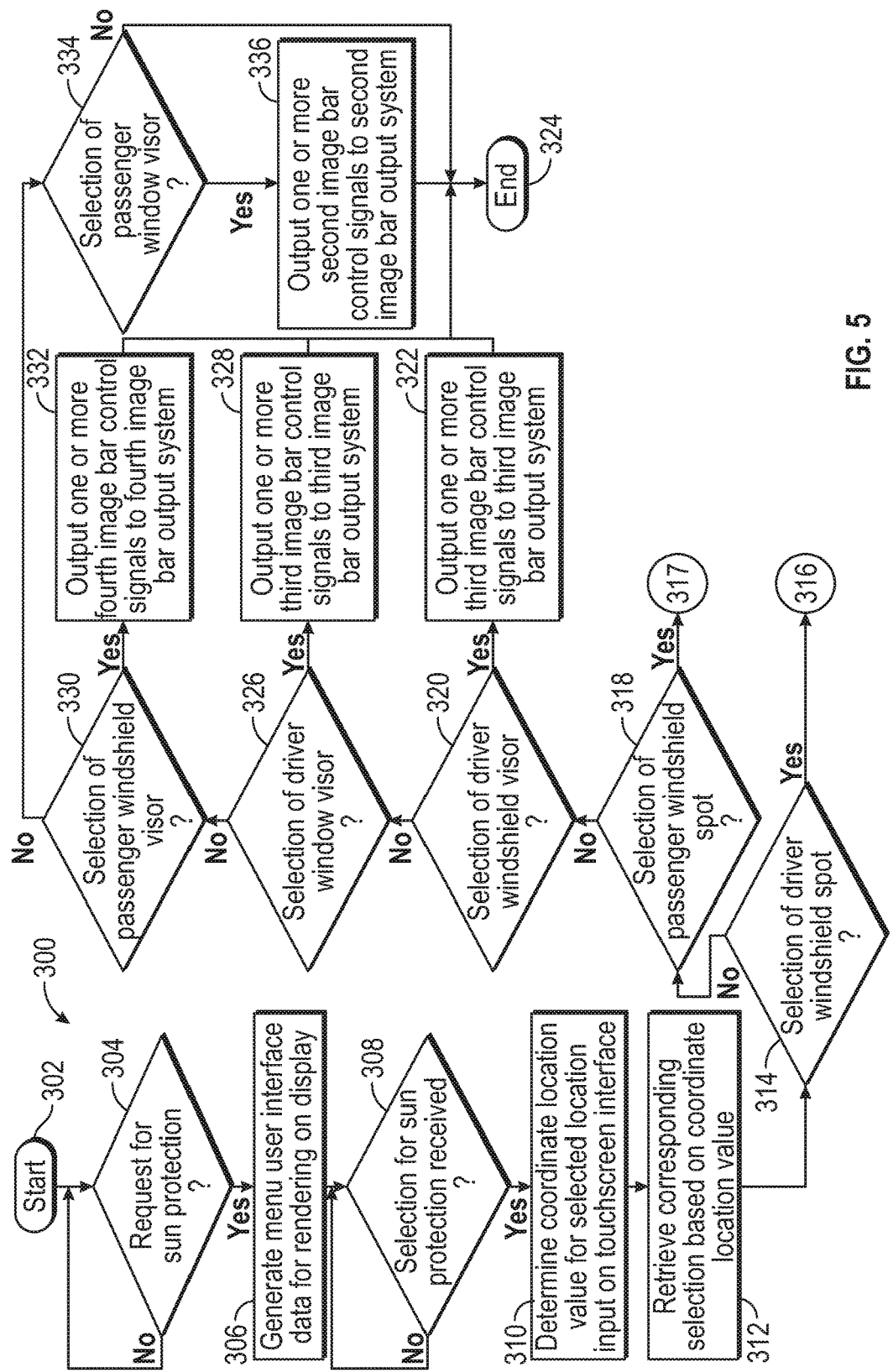
FIG. 5 is a flowchart illustrating a control method for the sun protection system of the vehicle of FIG. 1, in accordance with various embodiments.

Referring now to FIG. 5, and with continued reference to FIGS. 1-3, a flowchart illustrates a control method 300 that can be performed by the sun protection system 100 of FIGS. 1-3 in accordance with the present disclosure. In various embodiments, the control method 300 is performed by the processor 44 of the controller 40. As can be appreciated in light of the disclosure, the order of operation within the method is not limited to the sequential execution as illustrated in FIG. 5, but may be performed in one or more varying orders as applicable and in accordance with the present disclosure. In various embodiments, the method 300 can be scheduled to run based on one or more predetermined events, and/or can run continuously during operation of the vehicle 10.

The method begins at 302. At 304, the method determines whether a request for sun protection has been received. In other words, the method determines whether the input data 112 has been received from the human-machine interface 50, such as the request input data 116. If true, the method proceeds to 306. Otherwise, the method loops.

At 306, the method generates the menu user interface 121, which includes the menu user interface data 119, for rendering the menu user interface 121 on the display 54. At 308, the method determines whether a selection has been received from the user. Stated another way, the method determines whether the input data 112 has been received from the human-machine interface 50, such as the menu input data 117. If true, the method proceeds to 310. Otherwise, the method loops.

At 310, the method processes the signals from the menu input data 117, and determines the coordinate location value for the position of the input received to the touchscreen interface 58. At 312, based on the coordinate location value, the method queries the UI datastore 103 and retrieves the corresponding selection 105. At 314, the method determines whether the selection 105 corresponds to a selection of a "Driver Windshield Spot" or the sun protection selection 184a (FIG. 4). If true, the method proceeds to 316 on FIG. 6.

Otherwise, at 318, the method determines whether the selection 105 corresponds to a selection of a "Passenger Windshield Spot" or the sun protection selection 184d (FIG. 4). If true, the method proceeds to 317 on FIG. 7.

Otherwise, at 320, the method determines whether the selection 105 corresponds to a selection of a "Driver Windshield Visor" or the sun protection selection 184b (FIG. 4). If true, the method proceeds to 322. At 322, the method outputs the one or more third image bar control signals 148 to the third image bar output system 67c of the third stationary projector 53c to define the visor on the windshield 20a. The method ends at 324.

If the selection 105 does not correspond with the selection of the "Driver Windshield Visor," at 326, the method determines whether the selection 105 corresponds to a selection of a "Driver Window Visor" or the sun protection selection 184c (FIG. 4). If true, the method proceeds to 328. At 328, the method outputs the one or more first image bar control signals 144 to the first image bar output system 67a of the first stationary projector 53a to define the visor on the respective side window 20c. The method ends at 324.

If the selection 105 does not correspond with the selection of the "Driver Window Visor," at 330, the method determines whether the selection 105 corresponds to a selection of a "Passenger Windshield Visor" or the sun protection selection 184e (FIG. 4). If true, the method proceeds to 332. At 332, the method outputs the one or more fourth image bar control signals 150 to the fourth image bar output system 67d of the fourth stationary projector 53d to define the visor on the windshield 20a. The method ends at 324.

If the selection 105 does not correspond with the selection of the "Passenger Windshield Visor," at 334, the method determines whether the selection 105 corresponds to a selection of a "Passenger Window Visor" or the sun protection selection 184f (FIG. 4). If true, the method proceeds to 336. At 336, the method outputs the one or more second image bar control signals 146 to the second image bar output system 67b of the second stationary projector 53b to define the visor on the respective side window 20c. The method may end at 324. Alternatively, the method may return to outputting the menu user interface data 119 for rendering the menu user interface 121 on the display 54 to receive an additional selection for sun protection at 306. As a further alternative, the method may determine whether additional input is received, via the human-machine interface 50, which selects a return icon, such as the return icon 208 (FIG. 4A) and may output the menu user interface data 119 for rendering the menu user interface 121 on the display 54 based on the receipt of the user input.

Figure 6:
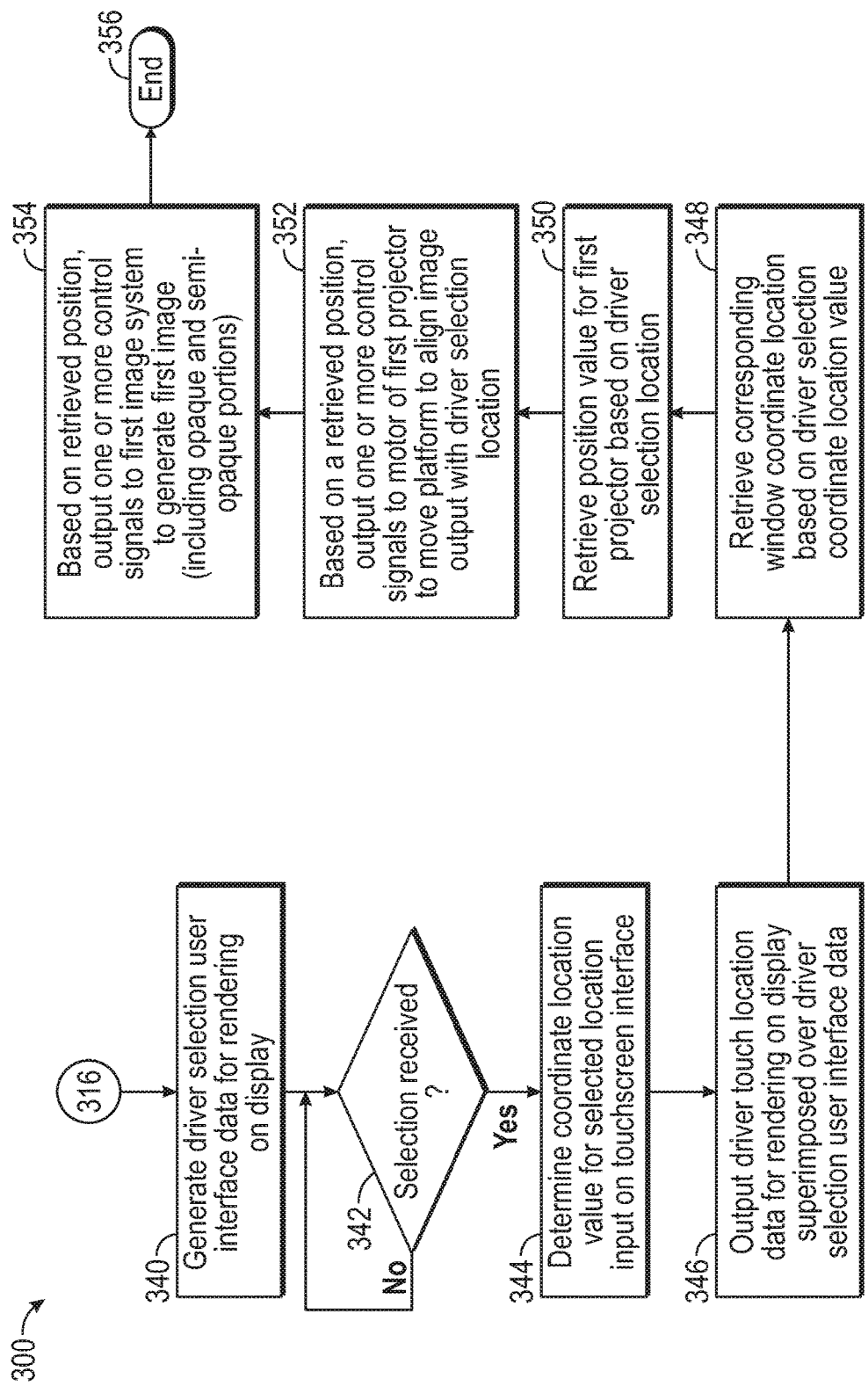
FIG. 6 is a continuation of the flowchart of FIG. 5, in accordance with various embodiments.

From 316 of FIG. 5, referring now to FIG. 6, at 340, the method generates the driver selection user interface data 122 for rendering the driver selection user interface 122 on the display 54. At 342, the method determines whether a selection has been received from the user. Stated another way, the method determines whether the input data 112 has been received from the human-machine interface 50, such as the driver selection input data 114. If true, the method proceeds to 344. Otherwise, the method loops.

At 344, the method processes the signals from the driver selection input data 114, and determines the driver selection coordinate location value 118 for the position of the input received to the touchscreen interface 58. At 346, the method generates and outputs the driver touch location data 124 for rendering the icon, such as the icon 206 (FIG. 4A) on the display 54 superimposed over the graphical representation of the driver selection user interface data 120. At 348, the method queries the table datastore 104 and retrieves the window coordinate location value 126 that corresponds with the driver selection coordinate location value 118. At 350, the method queries the position table datastore 108 and retrieves the position values 130 for the first movable projector 52a that correspond with the (Y, Z) coordinates of the driver selection location 128. At 352, based on the retrieved position values 130, the method generates and outputs one or more control signals to the first motor 56a of the first movable projector 52a (i.e. the first projector motor control signals 132) to move the movable platform 61a to substantially align the output of the first image output system 66a with the (Y, Z) coordinates of the driver selection location 128.

At 354, the method generates and outputs one or more control signals to the first image output system 66a of the first movable projector 52a (i.e. the first projector image output control signals 136) to output the first image, including the opaque portion 250a and the semi-opaque portion 252a (FIG. 2). The method may end at 354, or may return to outputting the menu user interface data 119 for rendering the menu user interface 121 on the display 54 to receive an additional selection for sun protection. Alternatively, the method may determine whether additional input is received, via the human-machine interface 50, which selects a return icon, such as the return icon 208 (FIG. 4A) and may output the menu user interface data 119 for rendering the menu user interface 121 on the display 54 based on the receipt of the user input. Generally, the first image remains at the selected location until additional input is received, via the human-machine interface 50, which selects an off icon, such as the off icon 209 (FIG. 4A); additional input is received, via the human-machine interface 50 that selects a different location for the sun protection; or the propulsion system 30 is powered off or shut down.

From 317 of FIG. 5, referring now to FIG. 7, at 360, the method generates the passenger selection user interface data 131 for rendering the passenger selection user interface 133 on the display 54. At 362, the method determines whether a selection has been received from the user. Stated another way, the method determines whether the input data 112 has been received from the human-machine interface 50, such as the passenger selection input data 113. If true, the method proceeds to 364. Otherwise, the method loops.

At 364, the method processes the signals from the passenger selection input data 113, and determines the passenger selection coordinate location value 117 for the position of the input received to the touchscreen interface 58. At 366, the method generates and outputs the passenger touch location data 135 for rendering the icon, such as the icon 266 (FIG. 4B) on the display 54 superimposed over the graphical representation of the passenger selection user interface data 131. At 368, the method queries the table datastore 104 and retrieves the window coordinate location value 126 that corresponds with the passenger selection coordinate location value 117. At 370, the method queries the position table datastore 108 and retrieves the position values 130 for the second movable projector 52b that correspond with the (Y, Z) coordinates of the passenger selection location 137. At 372, based on the retrieved position values 130, the method generates and outputs one or more control signals to the second motor 56b of the second movable projector 52b (i.e. the second projector motor control signals 134) to move the movable platform 61b to substantially align the output of the second image output system 66b with the (Y, Z) coordinates of the passenger selection location 137.

At 374, the method generates and outputs one or more control signals to the second image output system 66b of the second movable projector 52b (i.e. the second projector image output control signals 138) to output the second image, including the opaque portion 250b and the semi-opaque portion 252b (FIG. 2). The method may end at 374, or may return to outputting the menu user interface data 119 for rendering the menu user interface 121 on the display 54 to receive an additional selection for sun protection. Alternatively, the method may determine whether additional input is received, via the human-machine interface 50, which selects a return icon, such as the return icon 208 (FIG. 4B) and may output the menu user interface data 119 for rendering the menu user interface 121 on the display 54 based on the receipt of the user input. Generally, the second image remains at the selected location until additional input is received, via the human-machine interface 50, which selects an off icon, such as the off icon 209 (FIG. 4B); additional input is received, via the human-machine interface 50 that selects a different location for the sun protection; or the propulsion system 30 is powered off or shut down.

Thus, the sun protection system 100 enables an occupant, such as a driver and/or passenger, to select from a user interface, a desired location on a window for sun protection, and outputs one or more images each having an opaque portion and a semi-opaque portion that obstruct a glare of the sun without requiring the use of a mechanical movable overhead visor. Moreover, the opaque portion 250a and the semi-opaque portion 252a of the first image output by the first image output system 66a and the opaque portion 250b and the semi-opaque portion 252b of the second image output by the second image output system 66b provide sun protection without reducing visibility out of the window 20. Further, the images 71a-71d output by the stationary projectors 53 provide additional sun protection, which also do not require the use of an overhead visor.

It should be noted that the sun protection system 100 described with regard to FIGS. 1-6 is merely exemplary, as various other systems and methods may be employed to protect an occupant of the vehicle 10 from the sun. For example, in the example of the vehicle 10 comprising an autonomous vehicle, one or more of the windows 20 may be digitized or may comprise a digitized screen, such that the controller 40 may output one or more commands to the digitized screen to render an opaque and a semi-opaque circle over the selected location to provide sun protection. In this example, the controller 40 may render a single pair of the opaque and the semi-opaque circles on a first occupant's side of the windshield, and a single pair of the opaque and a semi-opaque circles on a second occupant or passenger's side of the windshield to limit an amount of obstruction of the windshield. Furthermore, in the example of a digitized screen, the controller 40 may output one or more commands to the digitized screen to render a semi-opaque area of the window 20 to provide the visors for sun protection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for sun protection for an occupant of a vehicle having at least one window, comprising:
    receiving, by a processor, an input from a source that identifies a selected location for sun protection on the at least one window;
    receiving, by the processor, an input from a source that identifies a second selected location for sun protection on the at least one window, the second selected location spaced apart from the selected location;
    determining, by the processor, a coordinate location on the at least one window associated with the selected location and a second coordinate location on the at least one window associated with the second selected location;
    outputting, by the processor, one or more control signals to a first motor of a first projector to align a first image output system of the first projector to output a first image onto the at least one window at the coordinate location to provide sun protection for the occupant and one or more control signals to a second motor of a second projector to align a second image output system of the second projector with the second coordinate location on the at least one window, the first motor having a range of motion that is limited to 0% to 50% of a length of the at least one window, the second motor having a range of motion that is limited to 50% to 100% of the length of the at least one window such that the second image output by the second image output system remains within the 50% to the 100% of the length of the at least one window and the first image output by the first image output system remains within the 0% to the 50% of the length of the at least one window,
    wherein the first image includes a first opaque portion and a second semi-opaque portion at the coordinate location on the at least one window and the second image includes the first opaque portion and the second semi-opaque portion at the second coordinate location on the at least one window.

2. The method of claim 1, wherein the receiving the input from the source that identifies the selected location further comprises:
    receiving a request for sun protection from a source of input;
    generating, by the processor, selection user interface data for rendering on a display associated with the vehicle that includes a graphical representation of the at least one window; and
    receiving the input from a touchscreen interface associated with the display that identifies the selected location on the graphical representation of the at least one window.

3. The method of claim 2, wherein the determining, by the processor, the coordinate location on the at least one window associated with the selected location further comprises:
    processing, by the processor, the received input from the touchscreen interface to determine a selected coordinate location value for the selected location; and
    retrieving, by the processor, a window coordinate location value from a table datastore based on the selected coordinate location value.

4. The method of claim 1, wherein the first opaque portion has a first diameter, which is different than a second diameter of the second semi-opaque portion, the second semi-opaque portion overlaps the first opaque portion and the second semi-opaque portion is concentric with the first opaque portion.

5. The method of claim 1, further comprising:
    receiving, by the processor, an input from a source that identifies a third selected location for sun protection on the at least one window; and
    outputting, by the processor, one or more control signals to a third image output system of a third stationary projector to output a third image onto the at least one window to provide sun protection for the occupant.

6. A system for sun protection for an occupant of a vehicle having at least one window, comprising:
    a source of input that identifies a selected location for sun protection on the at least one window;
    a source of input that identifies a second selected location for sun protection on the at least one window, the second selected location spaced apart from the selected location;
    a first projector having a first image output system that is configured to output a first image, the first image output system movable relative to the vehicle by a first motor, the first motor having a range of motion that is limited to 0% to 50% of the length of the at least one window;
    a second projector having a second image output system that is configured to output a second image, the second image output system movable relative to the vehicle by a second motor, the second motor having a range of motion that is limited to 50% to 100% of the length of the at least one window such that the second image output by the second image output system remains within the 50% to the 100% of the length of the at least one window and the first image output by the first image output system remains within the 0% to the 50% of the length of the at least one window;
    a controller, having a processor, that is configured to:
        determine a coordinate location on the at least one window associated with the selected location;
        determine a second coordinate location on the at least one window associated with the second selected location;

output one or more control signals to the first motor to align the first image output system with the coordinate location on the at least one window;

output one or more control signals to the first image output system to output the first image onto the at least one window to provide sun protection for the occupant;

output one or more control signals to the second motor to align the second image output system with the second coordinate location on the at least one window; and output one or more control signals to the second image output system to output the second image onto the at least one window to provide sun protection for the occupant, wherein the first image includes a first opaque portion and a second semi-opaque portion at the coordinate location on the at least one window, and the second semi-opaque portion overlaps the first opaque portion and the second image includes the first opaque portion and the second semi-opaque portion at the second coordinate location on the at least one window.

7. The system of claim 6, wherein the source of input that identifies the selected location is a touchscreen interface associated with a display of the vehicle, and the controller is configured to receive a request for sun protection from the source of input and to generate selection user interface data for rendering on the display associated with the vehicle that includes a graphical representation of the at least one window, and the input from the touchscreen interface identifies the selected location on the graphical representation of the at least one window.

8. The system of claim 7, wherein the controller is configured to process the received input from the touchscreen interface to determine a selected coordinate location value for the selected location.

9. The system of claim 8, wherein the controller is configured to retrieve a window coordinate location value from a table datastore based on the selected coordinate location value to determine the coordinate location on the at least one window.

10. The system of claim 6, wherein the first opaque portion has a first diameter, which is different than a second diameter of the second semi-opaque portion and the second semi-opaque portion is concentric with the first opaque portion.

11. The system of claim 6, further comprising:
a source of input that identifies a third selected location for sun protection on the at least one window; and
a third stationary projector having a third image output system that is configured to output a third image,
wherein the controller is configured to output one or more control signals to the third image output system to output the third image onto the at least one window to provide sun protection for the occupant.

12. A vehicle having at least one window and a system for sun protection for an occupant, the vehicle comprising:
a touchscreen interface overlaid on a display associated with the vehicle that receives an input that identifies a selected location for sun protection on the at least one window;
a first projector having a first image output system that is configured to output a first image, the first image output system movable relative to the vehicle by a first motor, the first motor having a range of motion that is limited to 0% to 50% of the length of the at least one window;
a second projector having a second image output system that is configured to output a second image, the second image output system movable relative to the vehicle by a second motor, the second motor having a range of motion that is limited to 50% to 100% of the length of the at least one window such that the second image output by the second image output system remains within the 50% to the 100% of the length of the at least one window and the first image output by the first image output system remains within the 0% to the 50% of the length of the at least one window; and
a controller, having a processor, that is configured to:
determine a coordinate location on the at least one window associated with the selected location; and
at least one of output one or more control signals to the first motor to align the first image output system with the coordinate location on the at least one window and output one or more control signals to the first image output system to output the first image onto the at least one window to provide sun protection for the occupant, and output one or more control signals to the second motor to align the second projector with the coordinate location on the at least one window and output one or more control signals to the second image output system to output the second image onto the at least one window to provide sun protection for the occupant,
wherein the first image includes a first opaque portion and a second semi-opaque portion at the coordinate location on the at least one window, the first opaque portion has a first diameter, which is different than a second diameter of the second semi-opaque portion, and the second semi-opaque portion is concentric with the first opaque portion and the second image includes the first opaque portion and the second semi-opaque portion that is concentric with the first opaque portion.

13. The vehicle of claim 12, wherein the controller is configured to generate selection user interface data for rendering on the display associated with the vehicle that includes a graphical representation of the at least one window and the input from the touchscreen interface identifies the selected location on the graphical representation of the at least one window.

* * * * *